United States Patent
Suzuki et al.

(10) Patent No.: US 7,758,948 B2
(45) Date of Patent: Jul. 20, 2010

(54) LAMINATE SUPPORT

(75) Inventors: Shigenobu Suzuki, Yokohama (JP);
Nobuo Murota, Yokohama (JP);
Takashi Kikuchi, Yokohama (JP);
Hironori Hamazaki, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 691 days.

(21) Appl. No.: 11/593,523

(22) Filed: Nov. 7, 2006

(65) Prior Publication Data

US 2008/0090057 A1  Apr. 17, 2008

(30) Foreign Application Priority Data

Oct. 13, 2006  (JP) .............................. 2006-279735

(51) Int. Cl.
*B32B 3/24* (2006.01)
*E04B 1/99* (2006.01)
(52) U.S. Cl. ........................ 428/139; 52/167.7; 248/562
(58) Field of Classification Search ................. 428/139; 248/562; 52/167.7
See application file for complete search history.

(56) References Cited

U.S. PATENT DOCUMENTS 4,899,323 A * 2/1990 Fukahori et al. ............ 367/176
4,978,581 A * 12/1990 Fukahori et al. ............ 428/492

FOREIGN PATENT DOCUMENTS

JP  62-211471 A  9/1987

* cited by examiner

*Primary Examiner*—William P Watkins, III
(74) *Attorney, Agent, or Firm*—Sughrue Mion, PLLC

(57) ABSTRACT

A laminate support includes a layered elastic body structured by rigid plates, which have rigidity, and elastic plates, which have elasticity, being layered alternately in a predetermined layering direction, and a hollow portion is formed in the layered elastic body in the layering direction. A plastic fluid material structured by an elastic perfect plastic body (a non-hardening elastoplastic body) is placed-in the elastic body hollow portion of the layered elastic body. Further, a plurality of particle-shaped hard fillers, which are structured of a hard material which is considered to be a rigid body with respect to the plastic fluid material, are filled-in the plastic fluid material so as to be a predetermined volume fill rate. A laminate support, which can be disposed of or the like at a low cost and which can exhibit a large damping force, can be obtained.

4 Claims, 9 Drawing Sheets

LAMINATE SUPPORT

CROSS-REFERENCE TO RELATED APPLICATION

This application claims priority under 35 USC 119 from Japanese Patent Application No. 2006-279735, the disclosure of which is incorporated by reference herein.

BACKGROUND OF THE INVENTION

1. Field of the Invention

The present invention relates to a laminate support.

2. Description of the Related Art

A laminate support, in which soft plates of rubber or the like and hard plates of metal or the like are alternately layered, has conventionally been used as the bearing or the like of a base isolating device. Among such laminate supports, there are those in which, for example, a hollow portion is formed at the center, and a metal core is press-fit in the interior thereof.

Cores formed of lead whose damping performance is stable are often used as this metal core, but the costs required at the time of disposing of lead or the like are high. Therefore, a base isolating device, in which a viscous body and a solid substance are filled into the hollow portion instead of lead and the gaps of the solid substance are filled by the viscous body, is proposed in Japanese Patent Application Laid-Open (JP-A) No. 62-211471 (Japanese Patent Application Publication (JP-B) No. 7-84815). Partitioning members or columnar bodies and particle-shaped bodies are examples of the solid substance.

Further, JP-A No. 62-211471 exemplifies liquid bodies such as oil and the like as a viscous body which is combined with a particle-shaped hard material. However, in use over a long period of time, the hard members precipitate in the liquid body, and the dispersed state deteriorates. Therefore, the damping performance varies locally, and a stable damping performance cannot be exhibited. Further, the liquid body is not suitable with respect to the points that the flow resistance is low and a large damping force is obtained.

SUMMARY OF THE INVENTION

In view of the aforementioned, a subject of the present invention is to provide a laminate support which can be disposed of and the like at a low cost, and which can exhibit a large damping force.

A first aspect of the present invention has: a layered elastic body structured by rigid plates, which have rigidity, and elastic plates, which have elasticity, being layered alternately in a predetermined layering direction, a hollow portion being formed in the layered elastic body in the layering direction; a plastic fluid material structured by a non-hardening-type elastic perfect plastic body, and placed-in the hollow portion; and hard filler filled-in the plastic fluid material.

Accordingly, when the laminate support is set on a supported member, the load of a supporting member is supported by the layered elastic body. In particular, because the layered elastic body is structured by rigid plates and elastic plates being layered alternately, a high rigidity for supporting the supporting member is obtained.

The plastic fluid material is placed-in the hollow portion of the layered elastic body, and further, the hard filler is filled-in the plastic fluid material. In this way, the plastic fluid material contacts not only the inner surface of the hollow portion, but also the surfaces of the hard filler, and the contact surface area broadens. Therefore, the damping characteristic at the time of shearing deformation of the layered elastic body improves, and a large damping force is obtained. Namely, at the time of shearing deformation of the layered elastic body, the respective hard fillers also move mutually, and due to the plastic fluid material moving (flowing) between the hard fillers at this time, a large damping force can be obtained.

In particular, because the plastic fluid material is structured by an elastic perfect plastic body in the above-described aspect of the present invention, the dispersed state of the hard filler is stable, and precipitation of the hard filler is prevented (preferably, the hard filler does not precipitate). By preventing precipitation of the hard filler in this way, it is difficult for the dispersed state of the hard filler in the plastic fluid material to vary, and the damping characteristic is stable. Accordingly, even if the volume fill rate of the hard filler is lowered, the desired damping characteristic can be obtained.

Further, because a material requiring a high cost for disposal, such as lead or the like, is not used in the laminate support, it can be disposed of at a low cost.

In the above-described first aspect of the present invention, the shear yield stress τy of the plastic fluid material may be 0.1 MPa≦τy≦10 MPa.

By making the shear yield stress τy of the plastic fluid material be greater than or equal to 0.1 MPa, a sufficient damping performance can be obtained.

Further, by making the shear yield stress τy be less than or equal to 10 MPa, the plastic fluid material can be plastically-deformed greatly.

In the above-described first aspect of the present invention, the volume fill rate of the hard filler may be 25% to 74%.

The volume fill rate of the hard filler may further be in the range of 50% to 74%.

This "volume fill rate" shows, in percent, the ratio of the volume of the hard filler with respect to the sum of the volume of the plastic fluid material and the volume of the hard filler. By making the volume fill rate of the hard filler be greater than or equal to 25%, the contact surface area between the plastic fluid material and the hard filler is ensured to be broad, and the resistance at the time of flowing can be increased, and therefore, a large damping force can be obtained.

Further, by making the volume fill rate of the hard filler be greater than or equal to 50%, the contact surface area between the plastic fluid material and the hard filler is ensured to be even broader, and a particularly large damping force can be obtained. In order to make the volume fill rate of the hard filler be greater than or equal to 50%, a structure can be employed in which the number of hard fillers per unit volume is made to be large. In this structure, the intervals between the hard fillers are narrow, and therefore, a larger damping force can be obtained.

By making the volume fill rate be less than or equal to 74%, contact between the respective hard fillers is reduced and movement of the hard filler is facilitated, and a stable damping performance can thereby be exhibited.

In the above-described first aspect of the present invention, the hard filler may include particle-shaped bodies which are formed in shapes of particles.

By making the hard filler be particle-shaped bodies, it is easy to make the dispersed state of the hard filler in the plastic fluid material good, and the damping performance is stable.

Given that an average value of representative lengths L thereof is Lave, the size of the particle-shaped bodies can be made to be 0.001 mm≦Lave≦1.0 mm.

By making the size of the particle-shaped bodies be 0.001 mm≦Lave≦1.0 mm as the average value Lave of the representative lengths L, a high damping performance can be obtained.

Given that an average value of representative lengths L thereof is Lave, the size of the particle-shaped bodies can further be made to be in the range of 0.003 mm≦Lave≦0.3 mm.

By making the size of the particle-shaped bodies further be 0.003 mm≦Lave≦0.3 mm as the average value Lave of the representative lengths L, an even higher damping performance can be obtained.

In the above-described first aspect of the present invention, the shape of the hard filler may be substantially spherical.

By making the shape of the hard filler be substantially spherical, directional dependency of the hard filler is eliminated, and a stable damping performance in an arbitrary direction can be exhibited.

Because the present invention has the above-described structure, it can be disposed of or the like at a low cost, and can exhibit a large damping force.

BRIEF DESCRIPTION OF THE DRAWINGS

FIG. 1A is an overall structural diagram and FIG. 1B is a partial enlarged view.

FIG. 2A is an overall structural diagram and FIG. 2B is a partial enlarged view.

FIGS. 3A and 3B are partial enlarged views of a laminate support of a comparative example, wherein FIG. 3A shows a state before deformation and FIG. 3B shows a state after deformation.

DETAILED DESCRIPTION OF THE INVENTION

Figure 1A:
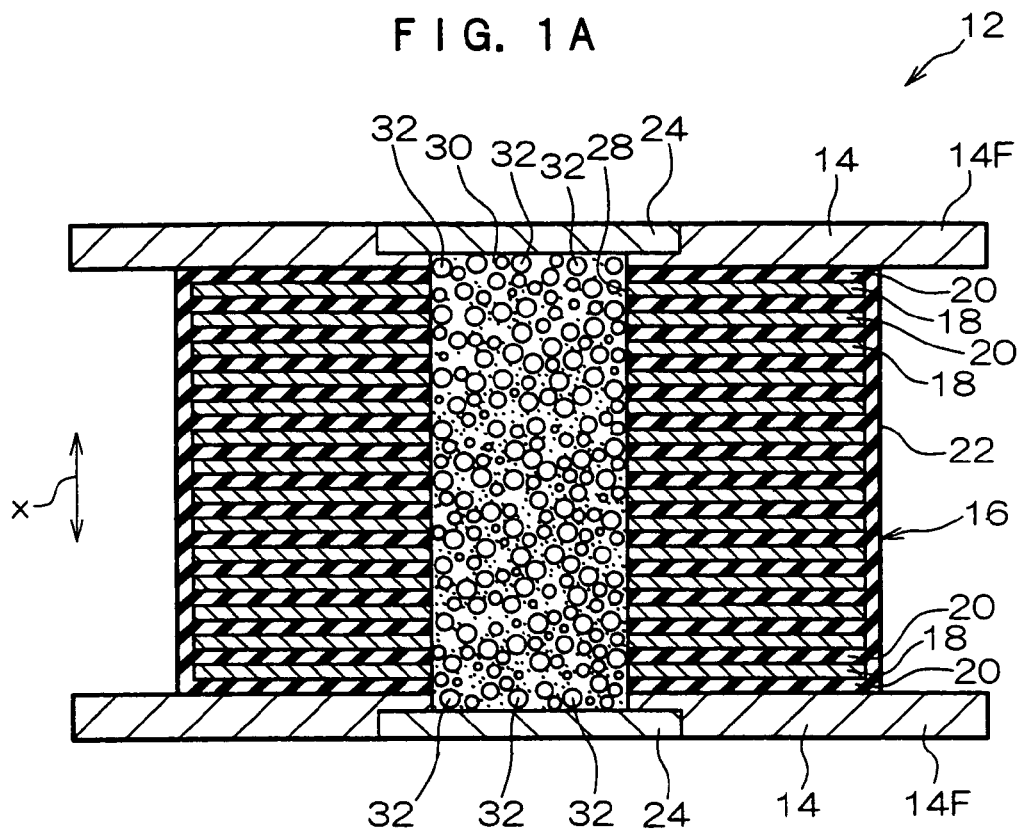
FIGS. 1A and 1B are cross-sectional views showing a laminate support of an embodiment of the present invention before deformation, where
Figure 1B:
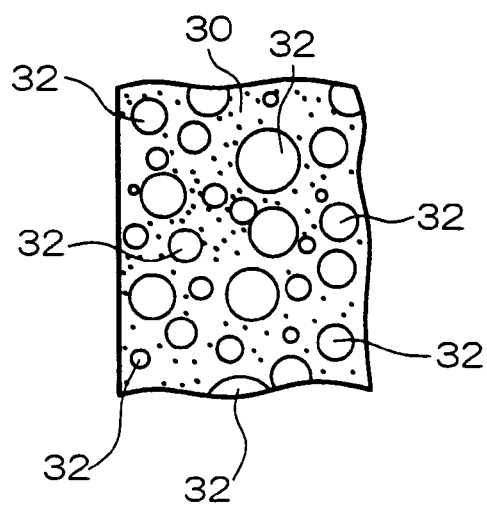

A laminate support 12 of a first embodiment of the present invention is shown in FIGS. 1A and 1B. The laminate support 12 has a layered elastic body 16 in which a plurality of disc-shaped metal plates 18 and a similar plurality of disc-shaped rubber plates 20 are layered alternately in the thickness direction (hereinafter, this direction of layering is called the "X direction").

Flange plates 14 are fixed to the X direction both end surfaces of the layered elastic body 16. The flange plates 14 have flange portions 14F which project-out sideways further than the layered elastic body 16. Bolts are inserted through unillustrated bolt holes formed in the flange portions 14F, and the laminate support 12 is fixed to a supporting member (e.g., the foundation of a building, groundsill, subsoil, or the like) and a supported member (e.g., an office building, a hospital, collective housing, an art museum, a public hall, a school, a government office building, a Shinto shrine or Buddhist temple, a bridge, or the like). In the mounted state, the supported member is supported at the supporting member via the laminate support 12.

The metal plates 18 and the rubber plates 20 structuring the layered elastic body 16 are strongly laminated together by vulcanization adhesion (or by an adhesive), such that they do not separate or the positions thereof do not become offset inadvertently. Further, when the laminate support 12 receives shearing force in the horizontal direction, the layered elastic body 16 as well shearingly-deforms elastically.

Accordingly, when the supporting member and the supported member move relatively (vibrate) in the horizontal direction, the layered elastic body 16 as a whole shearingly-deforms elastically. Here, due to the metal plates 18 and the rubber plates 20 being layered alternately as described above, even if load is applied in the layering direction, compressive deformation of the layered elastic body 16 (i.e., compression of the rubber plates 20) is suppressed.

The layered elastic body 16 further has a covering material 22 which covers the outer side end surfaces of the metal plates 18 and the rubber plates 20 from the periphery. Owing to the covering material 22, rain and light do not act on the metal plates 18 and the rubber plates 20 from the exterior, and deterioration due to oxygen, ozone, ultraviolet light, and the like is prevented. Further, the thickness of the covering material 22 is constant, and the covering material 22 is formed such that dispersion in the strength thereof does not arise. Note that the covering material 22 can be formed by the same material as the rubber plates 20. In this case, the rubber plates 20 and the covering material 22 are formed as separate bodies, and can be made integral by vulcanization adhesion or the like in an after-process. Or, the covering material 22 and the rubber plates 20 may be adhered by an adhesive or the like.

An elastic body hollow portion 28, which passes through the layered elastic body 16 in the X direction, is formed in the central portion of the layered elastic body 16. The elastic body hollow portion 28 is a cylindrical space in the present embodiment, but the shape thereof is not limited to cylindrical.

Figure 5:
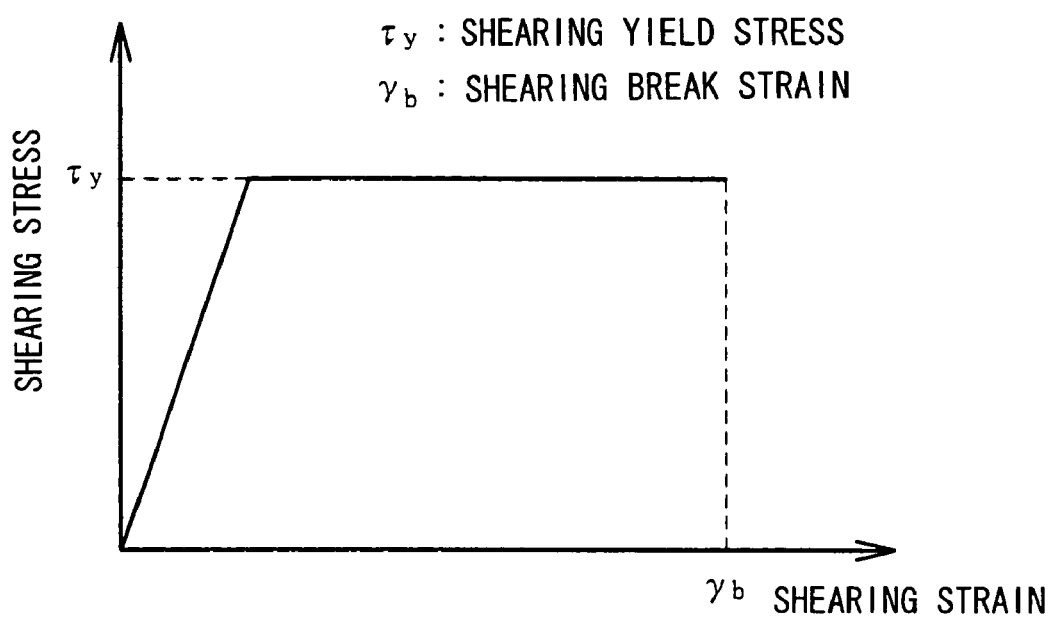
FIG. 5 is a graph showing a stress—strain characteristic of an elastic perfect plastic body.

A plastic fluid material 30, which is structured by an elastic perfect plastic body (a non-hardening elastoplastic body) is placed-in the elastic body hollow portion 28. This elastic perfect plastic body means a material which, up to a given yield point, exhibits elastic behavior such that the shearing stress and the shearing strain are proportional, and, when this yield point is exceeded, exhibits plastic behavior such that the shearing stress is constant, as shown schematically in FIG. 5.

Examples of the plastic fluid material 30 are unvulcanized rubber, thermoplastic elastomer, and the like, but the plastic fluid material 30 is not limited to these. Examples of the main component (polymer) of unvulcanized rubber are natural rubber (NR), styrene-butadiene rubber (SBR), styrene-propylene rubber (EPM, EPDM), silicone rubber (Q), and the like. Further, compounding agents such as carbon black, calcium carbonate, oils/resins, and the like, may be compounded into the unvulcanized rubber or thermoplastic elastomer or the like.

A plurality of sphere-shaped spherical bodies 32, which are structured of a hard material which can be considered to be a rigid body with respect to the plastic fluid material 30, are filled in the elastic body hollow portion 28, i.e., the plastic fluid material 30 so as to be a predetermined volume fill rate. This "volume fill rate" shows, in percent, the ratio of the volume of the spherical bodies 32 with respect to the sum of the volume of the plastic fluid material 30 and the volume of the spherical bodies 32.

The spherical bodies 30 are an example of the hard filler of the present invention, but it suffices for the material of the hard filler to be a material which is hard to a degree that it can be considered to be a rigid body with respect to the plastic fluid material 30. For example, metals, ceramics, engineering plastics, and the like may be applied, but the material is not limited to these. Concrete examples of metals are powders whose main component is pure iron or an iron such as carbon steel or stainless steel or the like.

Closing plates 24 are disposed at the end portions of the elastic body hollow portion 28. The closing plates 24 are formed in the shapes of discs of a diameter larger than the elastic body hollow portion 28, so as to be able to close the X direction end portions of the elastic body hollow portion 28. The elastic body hollow portion 28 can be sealed-up by fixing the closing plates 24 to the flange plates 14.

Figure 2A:
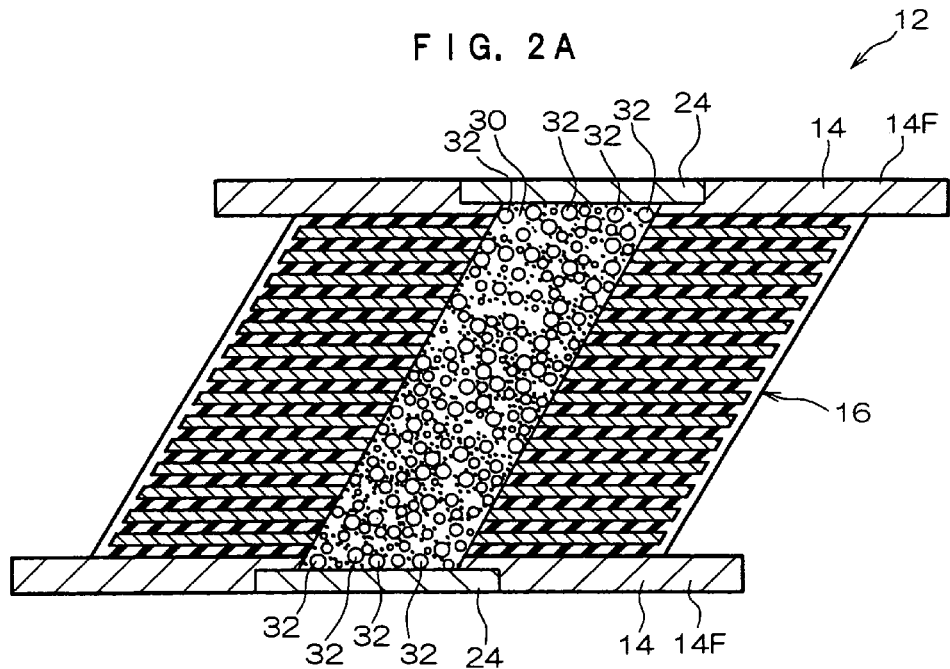
FIGS. 2A and 2B are cross-sectional views showing the laminate support of the embodiment of the present invention after deformation, where
Figure 2B:
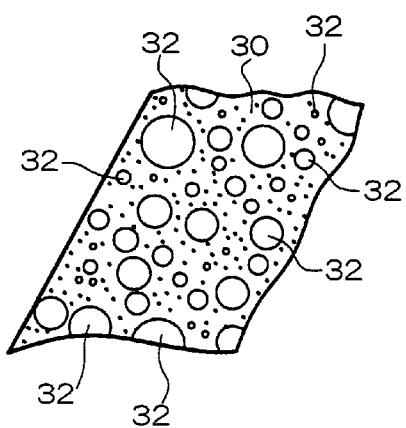

In the laminate support 12 of the first embodiment having such a structure, due to the supporting member and the supported member moving relatively (vibrating) in the horizontal direction, the layered elastic body 16 shearingly-deforms elastically as shown in FIG. 2A. At this time, as shown in FIG. 2B, the plastic fluid material 30 within the elastic body hollow portion 28 also shearingly-deforms on the whole while flowing, and absorbs energy. In the present embodiment, because the spherical bodies 32 are filled in the plastic fluid material 30, the plastic fluid material 30 contacts not only the inner surface of the elastic body hollow portion 28, but the surfaces of the spherical bodies 32 as well. The surface area of contact is broader, and it is difficult for the plastic fluid material 30 to flow due to the interposition of the spherical bodies 32. Therefore, the damping characteristic at the time of the shearing deformation of the layered elastic body 16 improves, a greater damping force is exhibited, and energy can be absorbed.

Figure 3A:
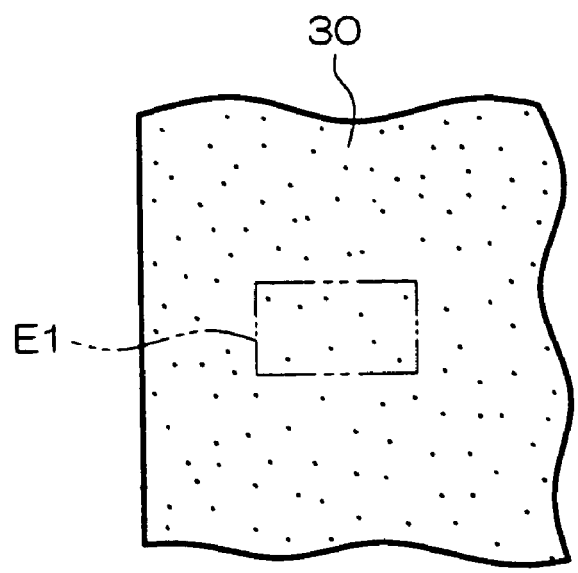
Figure 3B:
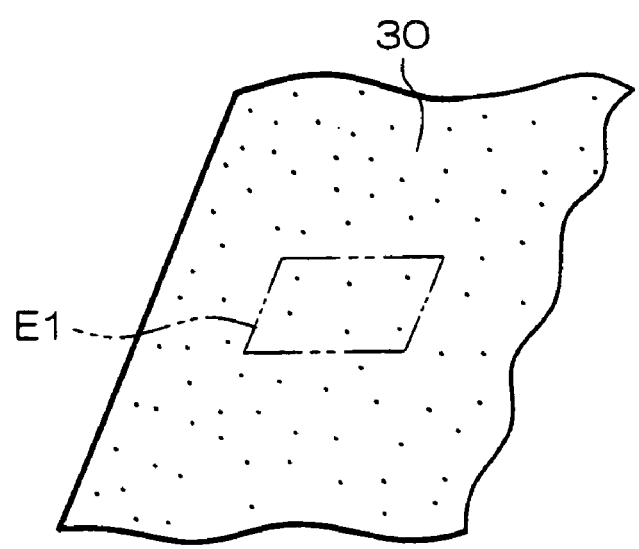

Only the plastic fluid material 30 portion of a layered elastic body of a comparative example, which has the same structure except that the spherical bodies 32 (hard filler) such as those of the present embodiment are not filled therein, is shown in an enlarged manner in FIG. 3A. In the layered elastic body of the comparative example, the plastic fluid material 30 contacts only the inner surface of the elastic body hollow portion 28. Accordingly, for example, imagining a rectangular parallelepiped region E1 in a cross-section before deformation as shown in FIG. 3A, because this region E1 merely shearingly-deforms as shown in FIG. 3B, there are limits on the damping force. On the other hand, in the present embodiment, because the spherical bodies 32 (the hard filler) move and the plastic fluid material 30 also moves (flows) through the narrow gaps between the spherical bodies 32 (the hard filler), a large damping force is obtained.

In particular, in the present embodiment, because the plastic fluid material 30 is structured by an elastic perfect plastic body (a non-hardening elastoplastic body), the dispersed state of the filled spherical bodies 32 (hard filler) is stable. Namely, the spherical bodies 32 are distributed uniformly in the plastic fluid material 30, without precipitating or being maldistributed inadvertently. Therefore, the damping characteristic of the plastic fluid material 30 does not vary at portions, and a stable damping performance can be exhibited.

Further, in the present embodiment, in order to obtain a desired damping force in this way, there is no need for a member made of lead such as a conventional lead plug. Therefore, disposal at a low cost is possible.

Figure 4A:
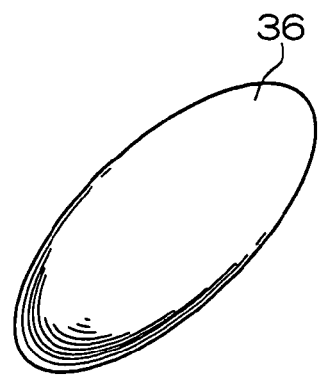
FIGS. 4A through 4F are each a perspective view showing an example of a hard filler which can be applied to the laminate support of the present invention.
Figure 4B:
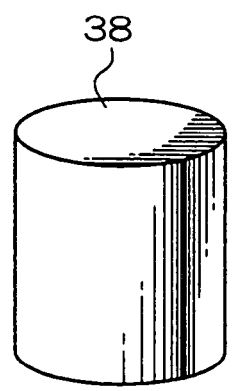
Figure 4C:
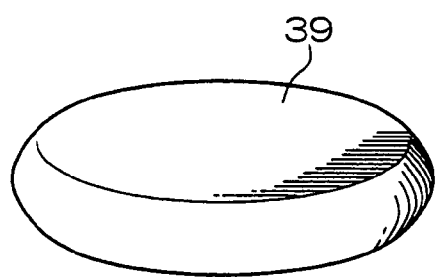
Figure 4D:
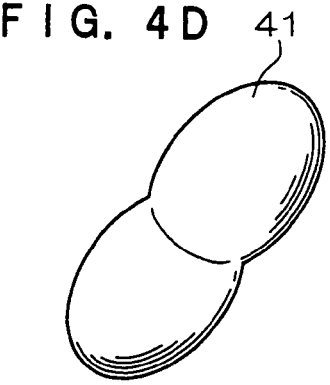

Note that, in the present embodiment, the spherical bodies 32 which are formed in the shapes of spheres are given as an example of the hard filler of the present invention. However, in short, the hard filler is not particularly limited provided that, by being filled in the plastic fluid material 30, the hard filler contacts the plastic fluid material 30 and increases the surface area of contact, and can increase the flow resistance of the plastic fluid material 30. Examples are a hard filler 36 shaped as a spheroid shown in FIG. 4A, a hard filler 38 shaped as a cylindrical column shown in FIG. 4B, a hard filler 39 shaped as a disc shown in FIG. 4C, a hard filler 41 having a shape in which the longitudinal direction central portion of a spheroid is contracted (a so-called "peanut-shell" shape) shown in FIG. 4D, and the like.

Figure 4E:
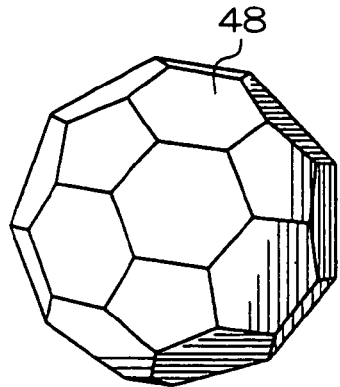
Figure 4F:
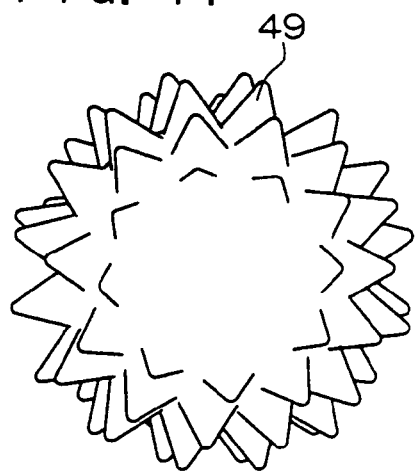

Note that, when the hard filler is spherical as in the present embodiment, the directionality thereof disappears, and therefore, a stable damping characteristic in an arbitrary direction can be exhibited. Perfect spheres are of course included in "spherical" in this case, but they do not have to be perfect spheres provided that they are to the extent that they substantially do not have directional dependency. For example, the hard filler may be a hard filler 48 shaped as a regular polyhedron, or of a shape in which the surfaces thereof are structured by pentagons or hexagons as shown in FIG. 4E (a so-called "soccer ball shape"), or may be a hard filler 49 of a shape in which a plurality of minute protrusions which are conical (or pyramid-shaped, truncated-cone-shaped, truncated-pyramid-shaped) are formed from the surface of a sphere such that the respective vertices are directed toward the outer side (a so-called "spikey ball" shape), or the like. In the case of the hard filler 48 shaped as a regular polyhedron, the greater the number of surfaces, the more the hard filler 48 approaches spherical and the directionality is annulled, and this is therefore preferable. In the case of the hard filler 49 shaped a spikey ball, if the sizes of the minute protrusions are made to be substantially uniform and offset in the distribution of the positions thereof is made to be small, the directionality due to the protrusions is made to be small, and this is therefore preferable.

Making the hard filler be particle-shaped bodies is preferable because filling thereof into the plastic fluid material 30 is easy and the damping performance is stable. For example, with regard to all of the aforementioned spheroid shape, cylindrical shape, disc shape, peanut shape, soccer ball shape, and spikey ball shape, the behaviors of the hard fillers within the plastic fluid material 30 are respectively independent, and therefore, they can be considered to be particle-shaped bodies. Further, as shown from FIG. 8A to FIG. 8F, even a hard filler 51 of a non-uniform shape (whose shape is not fixed) is included among the particle-shaped bodies mentioned here provided that they are respectively independent and particle-shaped.

In a case in which the hard filler is made to be particle-shaped bodies, if the size thereof is made to be greater than or equal to 0.001 mm and less than or equal to 1.0 mm as an average value Lave of representative lengths L, a high damping performance can be obtained, which is preferable. Further, if the size of the particle-shaped bodies is made to be greater than or equal to 0.003 mm and less than or equal to 0.3 mm similarly as the average value Lave of the representative lengths L, an even higher damping performance can be obtained, which is more preferable.

As shown from FIG. 8A to FIG. 8F, the representative length L of the particle-shaped body means the longest distance (Feret's diameter) measured in one direction with respect to an observed surface (projected surface) obtained by using a magnifying lens (a microscope or a microscope or the like). Measuring the representative lengths L of a plurality of particle-shaped bodies and taking the average value thereof is the average value Lave as meant herein. Note that the representative lengths L are measured by taking the hard filler 51 of the non-uniform shapes in the examples shown from FIG. 8A to FIG. 8F, but the shape of the hard filler is not limited to the same, and the representative lengths L can be measured similarly for any of the hard fillers shown in FIGS. 4A through 4F for example.

Figure 6A:
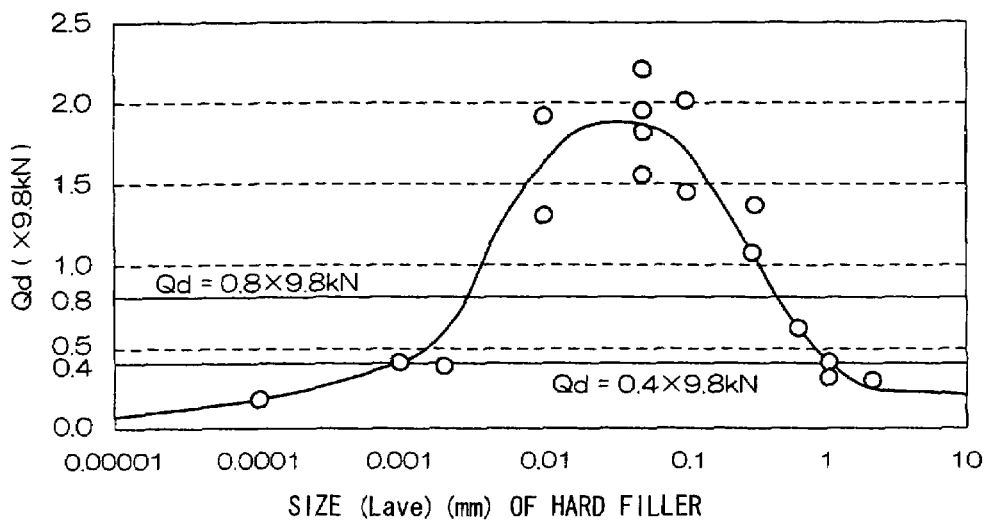
FIG. 6A is a graph showing the relationship between the size of the hard filler and the damping performance.
Figure 6B:
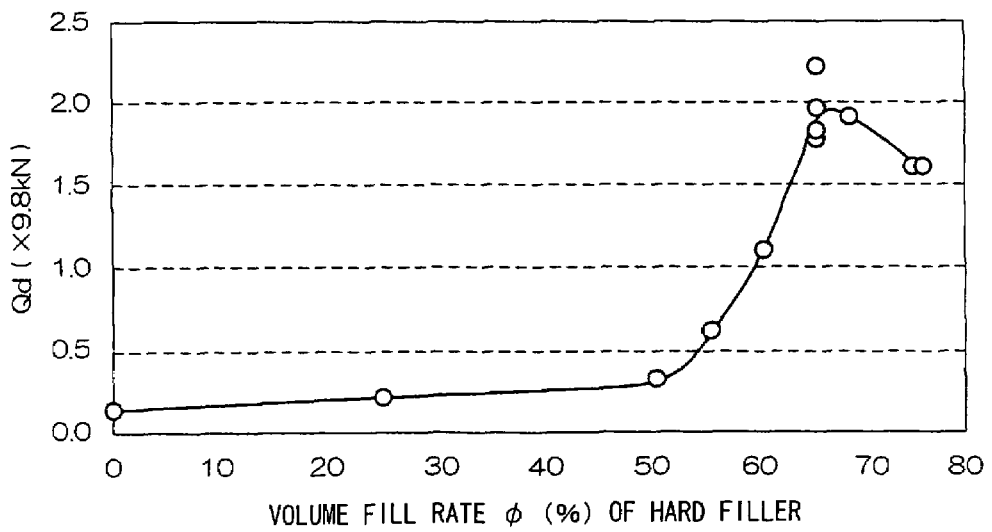
FIG. 6B is a graph showing the relationship between the volume fill rate of the hard filler and the damping performance.

The relationship between the size of the hard filler (the average value Lave of the representative lengths L) and the damping performance is shown in a graph in FIG. 6A. Further, the relationship between the volume fill rate 4 of the hard filler and the damping performance is shown in FIG. 6B. These graphs are obtained on the basis of the results of a test carried out by causing shearing deformation of a prescribed displacement by applying, to the laminate support 12 shown in FIG. 1A, force in the horizontal direction in a state in which a fixed load is applied thereto in the vertical direction by using a dynamic tester.

The structure of the laminate support 12 used in the conditions of the test is as follows.

| | |
|---|---|
| outer diameter of layered elastic body 16: | 225 mm |
| thickness per one rubber plate 20 of layered elastic body 16: | 1.8 mm |
| thickness per one metal plate 18 of layered elastic body 16: | 0.8 mm |
| number of layers of rubber plates 20 of layered elastic body 16: | 25 layers |
| outer diameter of plastic fluid material 30 in which hard filler is filled: | 45 mm |
| volume fill rate of hard filler: | 0%-75% |
| size (Lave) of hard filler: | 0.0001 mm-2.0 mm |

Further, the conditions of the test are as follows.

| | |
|---|---|
| shearing displacement amplitude: | 22.5 mm-112.5 mm (shearing strain: 50%-250%) |
| test frequency: | 0.33 Hz |
| compressive stress: | 10 MPa |

Figure 9:
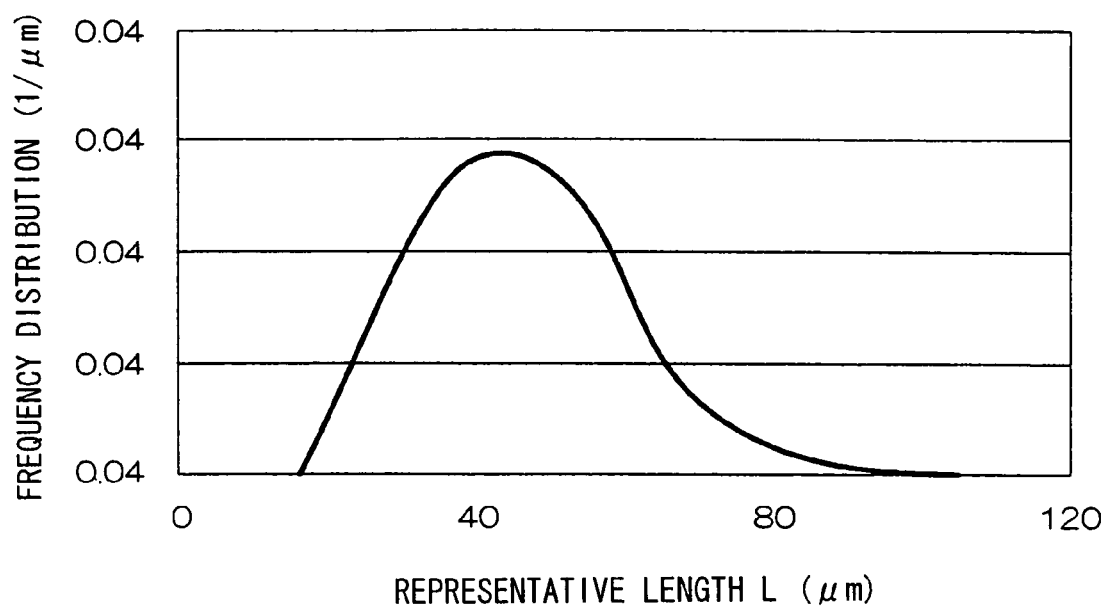
FIG. 9 is a graph showing the relationship between representative length and frequency distribution of the hard filler applied to the present invention.

Note that the representative lengths L of the hard fillers are values which differ for the respective hard fillers, but in the above-described test, as shown in FIG. 9, a particle group of a single-peak type (a distribution in which the maximum value of the frequency exists only at one place) is used as the frequency distribution thereof.

Figure 7:
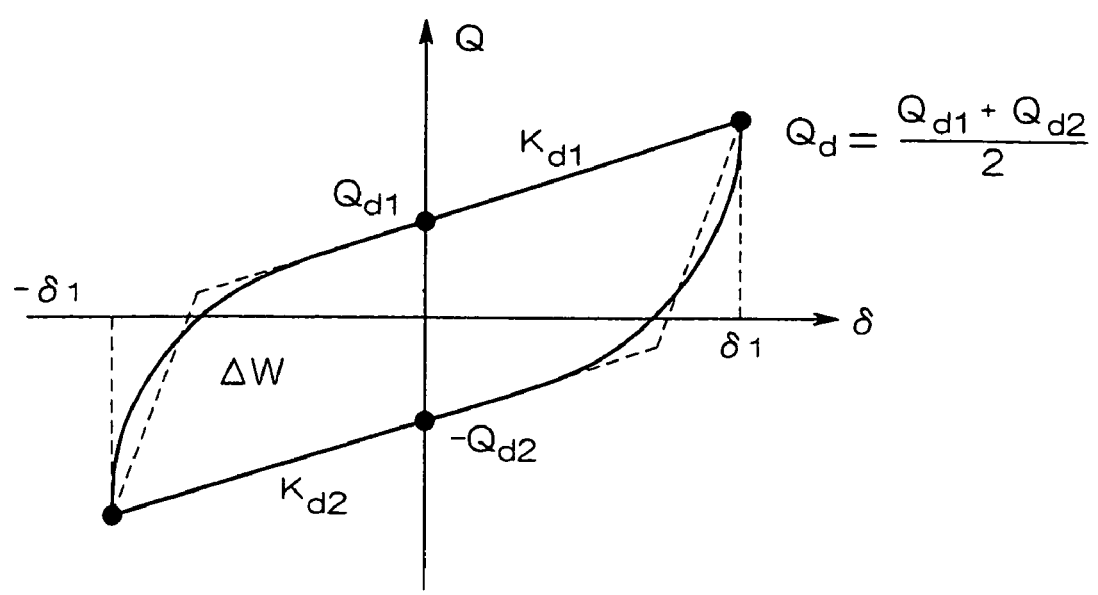
FIG. 7 is a graph showing the relationship between deformation displacement in a horizontal direction and horizontal direction load (Q) in the laminate support using the hard filler.
Figure 8A:
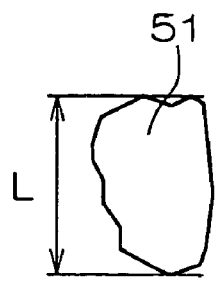
FIGS. 8A through 8F are front views showing examples of hard fillers which can be applied to the laminate support of the present invention, which examples are different than those shown in FIGS. 4A through 4F.
Figure 8B:
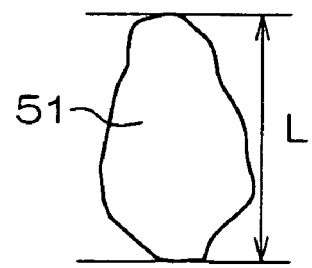
Figure 8C:
Figure 8D:
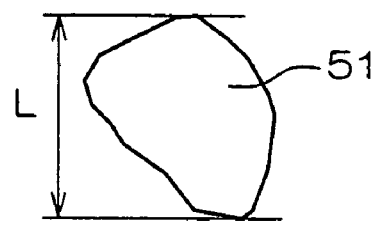
Figure 8E:
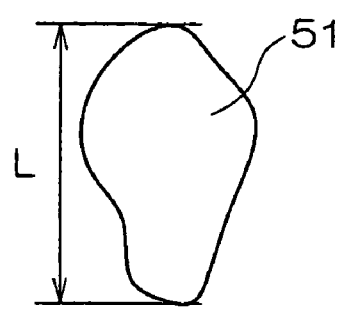
Figure 8F:
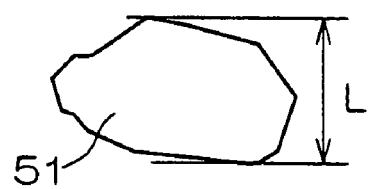

The relationship between deformation displacement ($\delta$) in the horizontal direction and horizontal direction load (Q) of the laminate support 12 in the test carried out in this way is shown in FIG. 7. In the actual laminate support 12, the wider the surface area of the region enclosed by the hysteresis curve, the greater the amount of energy of the vibration which can be absorbed. Further, from the standpoint of simplicity thereof and the like, a slice load Qd is often used as an index which realistically evaluates the damping performance. This slice load Qd is the horizontal load value at displacement 0, and is computed as $$Qd = (Qd1 + Qd2)/2$$

by using loads Qd1, Qd2 at the points where the hysteresis curve intersects the vertical axis. Moreover, the greater this value, the broader the surface area of the region enclosed by the hysteresis curve. The slice load Qd which is obtained in this way is on the vertical axes of the graphs of FIGS. 6A and 6B. Further, on the horizontal axis of the graph of FIG. 6A, the size (Lave) of the hard filler is shown as a logarithmic scale. Note that FIG. 6A is results in a case in which the volume fill rate of the hard filler is made to be 65%. FIG. 6B is results in a case in which the size (Lave) of the hard filler is made to be 0.05 mm.

From FIG. 6A, it can be understood that the damping performance is highest in the case when the size (Lave) of the hard filler is around 0.05 mm, and the damping performance gradually decreases whether the size (Lave) is larger or smaller than this. Further, it can be understood that, if the slice load Qd corresponding to the required damping performance is set to be, for example, greater than or equal to 0.4 (×9.8 kN), this condition is satisfied in a case in which the size (Lave) is greater than or equal to 0.001 mm and less than or equal to 1.0 mm. Moreover, it can be understood that, if, for example, the slice load Qd is set to be greater than or equal to 0.8 (×9.8 kN) in order to obtain an even higher damping performance, this condition is satisfied in a case in which the size (Lave) is greater than or equal to 0.003 mm and less than or equal to 0.3 mm.

Further, from FIG. 6B, when the volume fill rate $\phi$ of the hard filler increases, the damping performance as well generally becomes higher, but the range of a volume fill rate of 65% to 70% has the highest damping performance, and if it exceeds 70%, a slightly decreasing trend can be seen. Moreover, as compared with a case of a volume fill rate of 0%, if the volume fill rate is greater than or equal to 25%, the effect of filling the hard filler is confirmed, and, moreover, if the volume fill rate is greater than or equal to 50%, a damping effect of about twice is obtained. This is thought to be because, when the volume fill rate of the hard filler increases, the contact surface area between the plastic fluid material 30 and the hard filler can be ensured to be broad. However, when the volume fill rate of the hard filler exceeds 74%, because the contacting portions of the respective hard fillers increase, it is difficult to obtain a stable damping performance. Namely, by making the volume fill rate of the hard filler be less than or equal to 74%, the contacting portions of the respective hard fillers are reduced and movement of the hard filler is facilitated, and a stable damping performance can thereby be exhibited.

The above-described test was carried out in both a case in which a substance near spherical was used as the hard filler and a case in which a substance of a non-uniform shape was used as the hard filler, but a significant difference did not arise in the slice load Qd.

If the plastic fluid material is, in short, structured by an elastic perfect plastic body (a non-hardening elastoplastic body), the dispersed state of the hard filler can be stabilized. In particular, it is preferable that the shear yield stress $\tau y$ of the plastic fluid material is made to be greater than or equal to 0.1 MPa and less than or equal to 10 MPa. Namely, by making the shear yield stress $\tau y$ be greater than or equal to 0.1 MPa, a sufficient damping performance can be obtained. By making the shear yield stress $\tau y$ be less than or equal to 10 MPa, the plastic fluid material can be plastically-deformed greatly.

What is claimed is:

1. A laminate support comprising:
   a layered elastic body structured by rigid plates, which have rigidity, and elastic plates, which have elasticity, being layered alternately in a predetermined layering direction, a hollow portion being formed in the layered elastic body in the layering direction;
   a plastic fluid material structured by a non-hardening-type elastic perfect plastic body, the plastic fluid material being provided in the hollow portion; and
   a hard filler dispersed in the plastic fluid material, wherein the hard filler includes particle-shaped bodies,
wherein an average value Lave of representative lengths L of the particle-shaped bodies is 0.001 mm≦Lave≦0.05 mm, and
wherein the volume fill rate of the hard filler is 50% to 74%.

2. The laminate support of claim 1, wherein a shear yield stress τy of the plastic fluid material is 0.1 MPa≦τy≦10 MPa.

3. The laminate support of claim 1, wherein the hard filler is substantially spherical.

4. The laminate support of claim 1, wherein a slice load Qd, corresponding to a required damping performance, is set to be greater than or equal to 0.4×9.8 kN.

* * * * *